Oct. 16, 1934.                J. M. WILSON                1,977,030
                            PRESSURE TIGHT BEARING
                             Filed Aug. 3, 1932

INVENTOR
James M. Wilson.
BY
Raymond D. Jenkins.
ATTORNEY

Patented Oct. 16, 1934

1,977,030

UNITED STATES PATENT OFFICE 1,977,030

PRESSURE-TIGHT BEARING

James M. Wilson, East Cleveland, Ohio, assignor to Bailey Meter Company, a corporation of Delaware Application August 3, 1932, Serial No. 627,350

2 Claims. (Cl. 308—134)

The present invention relates to a pressure tight bearing, and is adapted for use where the fluid pressure within the casing, in the wall of which the bearing is formed, is greater or less than that of the atmosphere, as, for example, in the case of a differential pressure gage where the pressure operated devices are inside of a fluid tight casing, while the indicating or recording mechanism is outside, thus necessitating the passage of a shaft or equivalent connecting device through a wall of the casing. In many such instruments the pressure differentials encountered are very small, and it is, therefore, necessary to eliminate, to the greatest possible extent, the opposition to the movement of the instrument due to the friction in the bearing. The use of an ordinary stuffing box, or a cup leather packing is objectionable for this reason, the former because of the friction due to the pressure needed to keep the packing tight, and the latter because of the fact that the pressure itself acts upon the cup leather to keep the joint tight. Long, parallel metallic bearings have been used in some cases where the spindles are very small, but it is substantially impossible to make such bearings actually pressure tight, and foreign substances gradually work in, thus not only producing friction but wearing out the bearing.

Bearings have been used consisting of a flat piece of pliable material combined with a spindle which forms the male member of the bearing, the thin piece of pliable material having a hole closely fitting the spindle, wherein, due to the nature of the material used, it is possible to obtain a fit which is practically pressure tight and capable of withstanding certain pressures and at the same time cause a negligible amount of friction; the opening for the spindle through the wall of the casing being slightly larger than the spindle itself and one side of the wall at the end of the opening having a suitable surface against which the actual bearing is seated and suitably held.

I have found, however, that for the holding of relatively high static pressures within the casing with a minimum amount of spindle friction, the known types of bearings are unsatisfactory, and it is a main object of the present invention to provide a bearing wherein is a minimum of friction regardless of static pressure within the casing. I illustrate in the embodiment to be described hereinafter one means and arrangement whereby this preferred result is accomplished. It is understood, of course, that there are other possible means and arrangements whereby the broad idea of my invention may be carried out and that the illustration and description appended herewith constitute only a preferred embodiment.

Figure 1:
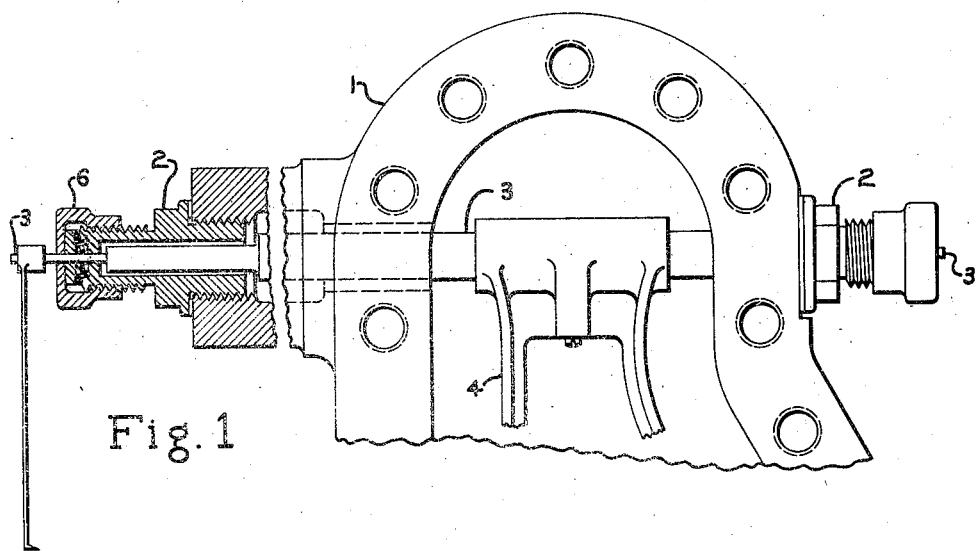
Fig. 1 illustrates a plan view, partially in section, of a part of a differential pressure gage embodying the invention.

In the construction shown, the bearing is made double, the spindle extending entirely through a portion of the casing and having bearings at opposite ends so that the spindle is balanced; that is, relieved from any end pressure which would result if one end of the spindle were subjected to a pressure greater than the other end.

I have shown the invention as applied to a differential pressure gage, a portion of which is shown as in the form of a chamber 1, into the side walls of which are screw-threaded bearing supports or bodies 2, each externally threaded at its projecting end. The spindle 3, which is actuated from the inside of the chamber by means of any suitable pressure receiving device through the agency of an arm or lever 4, extends in opposite direction through the supporting bodies 2, the openings in which are slightly larger than the spindle which is, therefore, not in frictional contact with the walls of the bodies.

The actual bearing for the spindle is formed in one or more flat bearing pieces of pliable material such, for example, as high-grade oil tanned leather, the spindle tightly fitting in a hole through said flat pieces so that the flat piece or pieces constitute the pressure tight bearing for the spindle. I show in the illustration for each bearing a plurality of such bearing pieces and have designated them as A, B and C, wherein the bearing piece A is nearest the body 2, B next, and C outermost from the body, successively on the spindle. Although I show for the bearing in each of the different views three such bearing pieces, it is to be understood that the invention is not limited thereto, but there may be a single bearing piece or a plurality of bearing pieces for each spindle bearing.

The flat piece or pieces of material constituting the bearing pieces are held in position against the end of the body by means of a follower 5 which is herein shown as a disc having an opening slightly larger than the spindle, the disc being held against the face of the outermost bearing piece C by means of a screw-threaded cap 6 screwed onto the threaded end of the body 2. This cap has an opening for the spindle which is large enough for the spindle to be out of contact therewith.

I preferably provide the outermost end of the body 2 (Figs. 1, 2 and 3) with a cylindrical recess 7, of a diameter closely approximating the greatest diameter of the bearing pieces A, B and C. Thus, as illustrated particularly in Fig. 2, when the bearing piece A is slipped on over the spindle 3, it snugly fits in the recess 7, tending to center the spindle 3 through the opening in the end of the body 2, which opening is at a slightly greater diameter than the diameter of the spindle. I show in Fig. 2 the second bearing piece B slid onto the spindle 3, next after the bearing piece A; then the bearing piece C and last the follower 5 which may be of metallic material and having a convex face toward the bearing piece C.

Figure 2:
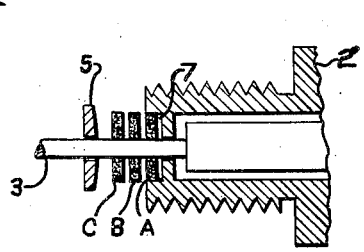
Figs. 2 and 3 illustrate to enlarged scale a sectional showing of a part of Fig. 1.
Figure 3:
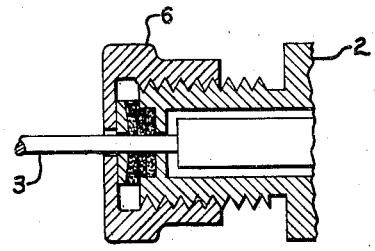

In Fig. 3 I show in operative assembly the arrangement of Fig. 2, to which has been applied the cap 6 screw-threaded onto the body 2 in a manner to first successively engage the follower 5 and bearing pieces C, B and A and after such engagement, upon continued threading of the cap onto the body 2, to cause the follower 5 and the bearing pieces to be moved toward the body 2 along the spindle 3 until the bearing piece A is completely seated in the recess 7. The bearing piece B is partially seated within the recess 7 and the bearing piece C, in the showing of Fig. 3, does not enter the recess 7 but upon continued pressure thereupon of the convex contact face of the follower 5, tends to squeeze outwardly beyond the edge of the recess 7.

The action upon continued screwing of the cap 5 onto the body 2 is for the follower 5 to impart a cushioning pressure to the entire surface of the bearing piece A transmitted through the bearing pieces C and B, respectively. In such cushioning pressure, the bearing piece C is somewhat distorted and the bearing piece B distorted to a lesser extent. However, I do not depend upon the bearing pieces C and B to hold fluid pressure from within the casing 4, but utilize them mainly as a cushioning intermediary between the follower 5 and the bearing piece A to apply to the bearing piece A as uniformly as possible complete surface pressure to the outer face of the bearing piece A without tending in any respect to distort the bearing piece A, either laterally toward or away from the spindle 3. It will be apparent that were I to put the follower 5 directly against the bearing piece A, I might tend to force the material of the bearing piece outwardly away from the spindle, thereby opening for leakage a passage along the spindle through the hole in A.

Due to the fact that the follower piece 5 is provided with a convex surface it will be apparent that upon screwing of the cap 5 onto the body 2, the pressure of the follower 5 against the bearing piece C will tend to move this bearing piece away from the spindle 3, and to a lesser degree this tendency may be present in the bearing piece B, but that there is no such tendency on the bearing piece A which seals the shaft to prevent escape of fluid pressure, so that in effect the bearing pieces B and C are primarily cushioning pieces that are not depended upon to prevent leakage of fluid pressure between the bearing pieces and spindle.

It will be seen that inasmuch as the bearing piece A is closely confined within the recess 7 and has applied to it substantially uniform pressure over its entire outer surface, it will be held tightly against the bottom of the recess without distortion relative to the passage therethrough which confines the spindle.

I show in Fig. 1 the complete assembly and duplicate therein a showing of the tightened assembly of Fig. 3.

It will be evident that I need not be limited to the three bearing pieces illustrated but that there may be a greater or lesser number of bearing pieces used. When I have a plurality of bearing pieces as illustrated, the outermost one in engagement with the follower 5 will tend to be distorted more than those successively toward the body 2, if I utilize as illustrated a convex face on the follower 5.

In any event, the primary or preferred arrangement of my invention is one wherein an intimate contact exists between the bearing piece and the spindle while the bearing piece is itself held on certain of the remaining surfaces rigidly against movement, or expansion, or movement away from the spindle, while on the remaining surface or surfaces is applied a cushioned compression or retaining force with a minimum of tendency to distort the bearing piece toward or away from the spindle.

Preferably I utilize as a material for the bearing pieces a chrome tanned leather, such as an oil filled, soft hydraulic leather treated with neatsfoot oil, and I find that by far the best material for such a bearing piece is that part of the leather separating the epidermis from the corium comprising a membrane called the "hyaline" or glassy layer. This forms the very thin grain surface of tanned leather which is of a structure different from the rest of the corium. It is very close and compact, becoming progressively looser in fiber structure toward the flesh. By skiving off the corium of chrome tanned leather as much as is practical, I have left a thin sheet of material including hyaline blending into the closest knit part of the corium and this I find is preferable as a bearing material. It is of fine texture, greasy looking, and not as fibrous as the corium generally and not as liable to soak up water or other fluids. It is more self-lubricating and in itself forms a self-lubricating bearing.

By using a number of such bearing pieces in lamination but not glued or fastened together, I have a bearing including hyaline but in layers which may give relative to each other radially, as above described, so that the one in contact with the follower 5 may squeeze out away from the spindle more than those successively beyond, while the whole constitutes a cushion for pressure from the follower through to the innermost one of the pieces within the recess 7.

It will be understood that I have illustrated and described only a preferred form of my invention and that the same may be accomplished with other materials and in other ways, and that I am to be limited only as to the claims in view of prior art.

What I claim as new, and desire to secure by Letters Patent of the United States, is:

1. A pressure-tight bearing comprising in combination, a spindle, a recessed body member provided with an axial opening through which the spindle extends, a plurality of disc shaped pieces of pliable material each having an axial opening closely fitting said spindle and at least one of which is adapted to fit into the recess in said body, and means for urging said discs against said body comprising a follower having a convex face which abuts one of the disk-shaped pieces and a cap adapted to be secured to said body member.

2. In combination, a pressure casing, a cylindrical body member adapted to be threaded into said casing and provided with external threads adjacent the outer end, the outer end of said member recessed and having an axial opening, a spindle loosely fitting said opening and extending from the interior to the exterior of said casing, a plurality of disc shaped pieces of pliable material each having an axial opening closely fitting said spindle at least one of which fits into said recess, a cap for urging said pieces against the bottom of said recess, and a metallic follower between said cap and discs having a flat surface bearing against said cap and a convex surface bearing against said discs.

JAMES M. WILSON.